United States Patent [19]

Buding

[11] Patent Number: 5,599,861
[45] Date of Patent: Feb. 4, 1997

[54] MOULDED, NON-CAKING MASTICATING AGENTS

[75] Inventor: Hartmuth Buding, Titz, Germany

[73] Assignee: Bayer Aktiengesellschaft, Leverkusen, Germany

[21] Appl. No.: 489,049

[22] Filed: Jun. 9, 1995

[30] Foreign Application Priority Data

Jun. 17, 1994 [DE] Germany ............... 44 21 265.8

[51] Int. Cl.$^6$ .............. C08K 5/375; C08K 5/101; C08L 7/00; C09K 3/00
[52] U.S. Cl. .............. 524/225; 524/315; 524/318; 524/925; 524/929; 252/182.14; 252/182.17
[58] Field of Search .............. 252/182.14, 182.17; 524/225, 925, 929, 315, 318

[56] References Cited

U.S. PATENT DOCUMENTS

| | | | |
|---|---|---|---|
| 4,129,538 | 12/1978 | Kaplan et al. ............... | 252/182.17 |
| 5,085,905 | 2/1992 | Beck ............... | 524/802 |
| 5,174,838 | 12/1992 | Sandstrom et al. ............... | 152/209 R |

FOREIGN PATENT DOCUMENTS

| | | |
|---|---|---|
| 0157079 | 10/1985 | European Pat. Off. . |
| 2820978 | 11/1978 | Germany . |

*Primary Examiner*—Peter A. Szekely
*Attorney, Agent, or Firm*—Connolly & Hutz

[57] ABSTRACT

This invention relates to moulded, non-dusting, non-caking, free-flowing masticating agents based on 2,2'-dibenzamidodiphenyl disulphide and mixtures of saturated fatty acids having an iodine number <25, a solidification point in the range from 50° to 68° C. and an acid number of 179 to 215. The masticating agents according to the invention are employed for reducing the viscosity of rubbers containing double bonds, and are normally used in amounts of 0.01 to 3 parts by weight, based on 100 parts by weight of rubber.

2 Claims, No Drawings

MOULDED, NON-CAKING MASTICATING AGENTS

This invention relates to moulded, non-dusting, non-caking, free-flowing masticating agents based on 2,2'-dibenzamidodiphenyl disulphide (DBD).

Masticating agents are chemical agents with the aid of which the viscosity of natural rubber (NR) can be reduced in a time-saving and energy-saving manner compared to purely mechanical mastication. The processability of NR, which has little plasticity, is improved by mastication, i.e. the incorporation of fillers and chemicals is made easier and a positive effect is exerted on its behaviour on calendering, extrusion and injection moulding. Masticating agents also have a viscosity-reducing effect in synthetic rubbers provided that these contain double bonds in the main chain, such as polyisoprene rubber, polybutadiene rubber or styrene-butadiene rubber, for example. Mastication may be carried out on a roll or in a kneader (W. Hoffmann, Kautschuk-Technologie, page 419 and page 429, Genter Verlag, Stuttgart, 1980).

A multiplicity of compounds has become known which act as masticating agents. Only masticating agents based on pentachlorothiophenol (PCTP) or DBD have been established industrially, however.

It is known that PCTP can be used as a masticating agent in the form of its zinc salt. It is also known that PCTP, as a formulation with activators (metallo-organic complexes) and inactive fillers (dispersing agents) such as kaolin for example, can be used as a masticating agent in the form of powder, oil coated powder or wax granules (M. Abele and Th. Kempermann, Kautschuk+Gummi Kunststoffe 42 (1989) 209).

Mastication procedures using mixtures of zinc salts of fatty acids and sulphur-containing aromatic masticating agents (e.g. DBD or the zinc salt of PCTP) are described in FR-PS 1 580 550. Analogous masticating agents, which also contain iron phthalocyanine in addition, are known from DE-PS 2 820 978.

DBD is also known as a masticating agent in the form of a powder (e.g. Pepton 22, a masticating agent manufactured by Anchor Chemical (UK) Ltd., Manchester MR11 4SR).

In addition, masticating agents comprising DBD, iron phthalocyanine and a diluent, e.g. various clays, diatomaceous earth, calcium carbonate, silica or waxes have been described (DE-OS 2 440 092). A preferred diluent is hydrous aluminium silicate. However, mixtures of inert, solid diluents can also be used (see page 6, lines 10–16). These masticating agent mixtures which contain diluents are free-flowing powders.

Small reductions in viscosity can also be obtained by the use of processing additives, such as stearic acid for example. However, to obtain large reductions in viscosity NR has to be masticated (W. Hoffmann, Kautschuk-Technologie, page 234, Genter Verlag, Stuttgart, 1980).

A common feature of all masticating agents or masticating agent formulations in powder form is firstly that they are flowable or free-flowing to a greater or lesser extent and secondly that they give rise to large amounts of dust when handled, e.g. when being weighed out, dosed and processed. This is a severe disadvantage as regards industrial hygiene. Oil coated powders exhibit a reduced tendency to give off dust. However in practice they are not completely dust-free if they are still to be made sufficiently free-flowing.

Moulded, non-dusting, non-caking, flee-flowing masticating agents based on DBD are increasingly being demanded by the rubber processing industry, both for reasons of industrial hygiene and for reasons of rationalising its operations as regards automated metering of the masticating agent fix the mastication process.

Moulded masticating agents which do not cake under load and which are produced from DBD, alumina, processing oil, a nonionic emulsifying agent and water are known from IP 067077 (18.04.83). A disadvantage of this method of production is that after granulation of the moistened mixture the water used, which is cited in Example 20 as parts per 100 parts DBD, has to be evaporated again. This constitutes a time-consuming and costly operation. In-house evaluations based on the teaching of DE-OS 2 440 092 (page 6, lines 10–16) have shown that low-dusting, moulded masticating agents can be obtained from DBD, kaolin, iron phthalocyanine and wax. Non-dusting, moulded masticating agents can also be easily obtained from DBD and wax (see Examples 1 to 4 of this Application). However, all these products have the disadvantage that they cake when stored under pressure at elevated temperature, which rules out the automated metering of these products for the mastication process.

The object of the present invention is to provide moulded, non-dusting masticating agents containing DBD which do not cake when stored under pressure and elevated 3.5 temperature, and which are thus always perfectly free-flowing and which can be incorporated and dispersed faultlessly and rapidly in the rubber to be masticated, in the usual mixing units of the rubber processing industry (e.g. rolls, kneaders).

The present invention therefore relates to moulded, non-dusting, non-caking, free-flowing masticating agents, characterized by a content of 90 to 10 weight % of 2,2'-dibenzamidodiphenyl disulphide (DBD), preferably 80 to 20 weight %, particularly 75 to 25 weight %, and a content of 10 to 90 weight %, preferably 20 to 80 weight %, particularly 25 to 75 weight %, of a mixture of saturated fatty acids with an iodine number <25, preferably <5, particularly <2, a solidification point in the range from 50° to 68° C., preferably in the range from 55° to 63° C., and an acid number of 179 to 215, preferably 195 to 210, and optionally 0.01 to 5 weight %, preferably 0.05 to 2 weight %, of activators to be deducted from the quantity of DBD, and/or optionally 10 to 70 weight %, preferably 20 to 60 weight %, of inert fillers to be deducted from the quantity of the mixture of saturated fatty acids, with the proviso that the fatty acid content must not fall below 10 weight %, preferably not below 20 weight %, in the mixture.

Fatty acids which are preferred in the sense of the invention are mixtures of saturated fatty acids having a carbon number of 14 to 22 C atoms, such as those which arise during the industrial fat-splitting of fats and fatty oils, optionally with a lower content of unsaturated fatty acids having an even carbon number and a maximum of three double bonds per molecule, such as palmitoleic acid, oleic acid or ricinoleic acid, linoleic acid or linolenic acid for example, characterized by an iodine number <25, preferably <5, particularly <2, a solidification point in the range from 50° to 68° C., preferably in the range from 55° to 63° C., and an acid number of 179 to 215, preferably 195 to 210.

In addition to industrial mixtures of saturated fatty acids, pure, saturated fatty acids with an even carbon number and a carbon chain length of $C_{14}$ to $C_{22}$, or mixtures thereof, can also be used.

Typical fatty acids for use as pure substances or as a mixture include myristic acid, palmitic acid, stearic acid, arachic acid and behenic acid.

Activators in the sense of the invention are the known compounds iron phthalocyanine and iron hemiporphyrazine (DE-OS 2 440 092; Ullmann's Encyclopedia of Industrial Chemistry, Fifth Edition, page 405, VCH Verlagsgesellschaft, Weinheim, 1993 ), or mixtures thereof.

Examples of inactive fillers (diluents) in the sense of the invention include kaolin, calcium carbonate, diatomaceous earth, kieselguhr and barium sulphate, and also mixtures thereof. Kaolin and calcium carbonate are particularly preferred inactive fillers.

In order to mould the masticating agent, the DBD, optionally the inactive fillers and optionally the activators, are used as fine powders in each case. The average particle diameter of these materials is <200 μm, preferably 0.01 to 100 μm, particularly 0.1 to 80 μm.

The saturated fatty acids in the sense of the invention are preferably used as a fine, spray-granulated material. The average particle diameter of this granular material is preferably <1000 μm, most preferably 10 to 800 μm, particularly 50 to 600 μm.

A preferred process for the production of the moulded masticating agents comprises batch mixing of the pulverulent constituents in rotating mixing vessels, such as drum mixers for example, which optionally also have installed mixing tools, such as plough blade mixers, propeller mixers or paddle mixers, for example, and also mixers with rapidly rotating mixing tools. Continuous mixers may also be used, however.

The pulverulent masticating agent mixture is then fed to a continuous single-shaft mixer (extruder), preferably to a continuous double-shaft mixer (double screw extruder), preferably with shafts rotating in the same direction. The saturated fatty acids in the sense of the invention are melted by suitably controlling the temperature in the extruder, and the paste obtained is pressed through a suitable perforated plate for the purpose of forming extruded granules.

However, the saturated fatty acids in the sense of the invention may also be pumped in molten form at a suitable point into the extruder on to the pulverulent, homogeneously mixed materials which are to be bonded, or may be sprayed into the mixing vessel as fine droplets.

A paste consisting of pulverulent DBD and molten fatty acids and/or pulverulent activators can also be processed to form flakes by spreading or pouring it on a chill roll, or can be processed to form pellets by means of a pelletising belt.

The moulded masticating agents can be excellently incorporated and dispersed in the rubber to be masticated.

Depending on the desired reduction in viscosity, the moulded masticating agent is used in amounts of 0.01 to 3 parts by weight, preferably 0.05 to 1 part by weight, based on 100 parts by weight of rubber.

EXAMPLE 1 (COMPARATIVE EXAMPLE)

A mixture of 40.8 weight % of DBD powder, 0.5 weight % of iron phthalocyanine powder and 33.2 weight % of kaolin powder was mixed in the laboratory in a 20 liter drum mixer with plow-shaped baffles manufactured by Lödinge, for 10 minutes at 150 rpm. The powdered mixture was then sprayed with molten paraffin (solidification point 66.5° C. according to DIN ISO 2207, viscosity 6.3 mm$^2$/sec at 100° C. according to DIN 51562, needle penetration 12 in 0.1 mm at 25° C. according to DIN 51579) in a high speed laboratory mixer fitted with knife-shaped blades, and was mixed so that the DBD, kaolin and activator formed a homogeneous dispersion in the wax. Extruded granules were then produced in a double-shaft extruder with shafts rotating in the same direction, fitted with a perforated plate. The diameter of the granules was 3.5 mm. The length of the granules was between about 5 and 8 mm.

EXAMPLE 2 (COMPARATIVE EXAMPLE)

The procedure employed was as in Example 1, except that a paraffin was used which had a solidification point of 71° C. according to DIN ISO 2207, a viscosity of 13.5 mm$^2$/sec at 100° C. according to DIN 51562, and a needle penetration of 26 in 0.1 mm at 25° C. according to DIN 51579.

EXAMPLE 3 (COMPARATIVE EXAMPLE)

81.6 weight % of DBD powder was sprayed with the same paraffin as described in Example 1, in a high speed laboratory mixer fitted with knife-shaped blades, and was mixed so that the DBD was homogeneously dispersed in the wax. Extruded granules were then produced as in Example 1.

EXAMPLE 4 (COMPARATIVE EXAMPLE)

The procedure employed was as in Example 3, except that the paraffin described in Example 2 was used.

EXAMPLE 5

0.8 weight % of DBD powder, 33.2 weight % of kaolin powder, 0.5 weight % of iron phthalocyanine powder and 25.5 weight % of a spray granulate of a saturated fatty acid mixture having an acid number of 205, an iodine number of 0.6, a solidification point of 59° C. and an average particle diameter of 380 μm ($C_{14}$: 2%, $C_{15}$:<1%, $C_{16}$: 28%, $C_{17}$: 2%, $C_{18}$: 66%, >$C_{18}$: 2%) were mixed in the drum mixer used in Example 1. Extruded granules were then produced as in Example 1.

EXAMPLE 6

The procedure employed was as in Example 5, except that 71.4 weight % of DBD powder and 28.6 of the spray-dried saturated fatty acid mixture were used, followed by granulation.

EXAMPLE 7

The caking behaviour of the extruded granules obtained in Examples 1 to 6 was tested under pressure and at elevated temperature, as follows:

50 g of extruded granules were previously introduced into a glass tube (inside diameter 50.3 mm) standing upright in a Petri dish and were loaded by a ram. (outside diameter 47.0 mm) at a pressure of 0.1729 kg/cm$^2$ for 2.5 days at an ambient temperature of 40° C. Thereafter the Petri dish was removed and the granular material was pushed out of the tube if necessary. The degree of caking was assessed as follows:

Rating 0: Sample poured from the glass tube by itself; no caking to the glass, no caking between individual granules.

Rating 1: Sample adhered to the glass and had to be pushed out with the ram; slight caking of the granules which could easily be loosened by hand.

Rating 2: Sample adhered to the glass and had to be pushed out with the ram; average caking of granules.

Rating 3: Sample adhered to the glass and had to be pushed out with the ram; pronounced caking of granules; granules could only be parted from each other with partial destruction.

The test results are summarized in Table 1. It can clearly be seen that the products according to the invention according to Examples 5 and 6 do not cake, and are thus clearly superior to the prior art products according to Examples 1 to 4.

TABLE 1

|  | Comparative Example No. | | | | Example No. according to the invention | |
|---|---|---|---|---|---|---|
|  | 1 | 2 | 3 | 4 | 5 | 6 |
| Rating | 1–2 | 2 | 2–3 | 3 | 0 | 0 |

I claim:

1. Moulded, non-dusting, non-caking, free-flowing masticating agents consisting essentially of 90 to 10 weight % of 2,2'-dibenzamidodiphenyl disulphide (DBD) and 10 to 90 weight % of a mixture of saturated fatty acids having an iodine number <25, a solidification point in the range from 50° to 68° C. and an acid number of 179 to 215, and optionally 0.01 to 5 weight % of activators to be deducted from the quantity of DBD, and/or optionally 10 to 70 weight % of inert fillers to be deducted from the quantity of the mixture of saturated fatty acids, with the proviso that the fatty acid content must not fall below 10 weight % in the mixture.

2. A rubber containing 0.01 to 3 parts by weight of the masticating agent of claim 1.

* * * * *